(12) United States Patent
Fetzer et al.

(10) Patent No.: US 9,092,963 B2
(45) Date of Patent: Jul. 28, 2015

(54) WIRELESS TRACKING DEVICE (75) Inventors: Dudley K. Fetzer, San Diego, CA (US);
Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 812 days.

(21) Appl. No.: 13/073,792

(22) Filed: Mar. 28, 2011

(65) Prior Publication Data

US 2011/0234397 A1 Sep. 29, 2011

Related U.S. Application Data (60) Provisional application No. 61/318,722, filed on Mar. 29, 2010.

(51) Int. Cl.
G08B 1/08 (2006.01)
G08B 25/01 (2006.01)
G08B 21/02 (2006.01)

(52) U.S. Cl.
CPC .......... *G08B 25/016* (2013.01); *G08B 21/0261* (2013.01); *G08B 21/0269* (2013.01)

(58) Field of Classification Search
USPC .................. 340/539.15, 539.13, 539.1, 573.1
See application file for complete search history.

(56) References Cited

U.S. PATENT DOCUMENTS

| 4,321,586 A | 3/1982 | Cooper et al. |
| 4,751,500 A | 6/1988 | Minasy et al. |
| 4,999,609 A | 3/1991 | Crossfield |
| 5,990,791 A | 11/1999 | Andreasen et al. |
| 6,388,612 B1 * | 5/2002 | Neher ....................... 342/357.54 |
| 7,502,619 B1 | 3/2009 | Katz |
| 8,229,473 B1 * | 7/2012 | De La Rue ................. 455/456.5 |
| 2004/0198382 A1 * | 10/2004 | Wong .......................... 455/456.1 |
| 2004/0204064 A1 | 10/2004 | Ikeda et al. |
| 2005/0075116 A1 | 4/2005 | Laird et al. |
| 2007/0069891 A1 * | 3/2007 | Wallace et al. .......... 340/539.15 |
| 2007/0109133 A1 * | 5/2007 | Kister et al. ............... 340/573.1 |
| 2008/0143604 A1 | 6/2008 | Mock et al. |
| 2008/0214142 A1 | 9/2008 | Morin et al. |
| 2010/0007485 A1 | 1/2010 | Kodrin et al. |

FOREIGN PATENT DOCUMENTS

| CN | 1434925 A | 8/2003 |
| CN | 101127144 A | 2/2008 |
| JP | H01155742 A | 6/1989 |

(Continued)

OTHER PUBLICATIONS

International Search Report and Written Opinion—PCT/US2011/030401—ISA/EPO—Jun. 20, 2011.

(Continued)

*Primary Examiner* — Travis Hunnings (57) ABSTRACT

An apparatus and method for a tracking device to inconspicuously track a person to be monitored (such as a child or at-risk adult) are presented. Some embodiments of the present invention combine a positioning receiver (e.g., a GPS receiver) and a locking mechanism to act as a tracking device, which attaches to an article of clothing or fabric wearable by the person to be monitored. Some embodiments of the present invention keep a positioning receiver and a radio frequency identification tag (RFID tag) or other RF tag, which are physically separate but in RF proximity of each other.

15 Claims, 10 Drawing Sheets

(56) References Cited

FOREIGN PATENT DOCUMENTS

| | | |
|---|---|---|
| JP | 2003529083 A | 9/2003 |
| JP | 2004112560 A | 4/2004 |
| JP | 2004336550 A | 11/2004 |
| JP | 2007323270 A | 12/2007 |
| JP | 2008017174 A | 1/2008 |
| JP | 2008209965 A | 9/2008 |
| JP | 2008541244 A | 11/2008 |
| JP | 2010506286 A | 2/2010 |
| KR | 2008010160 A | 11/2008 |
| KR | 20080109371 A | 12/2008 |
| KR | 20100004644 A | 1/2010 |
| KR | 20100028993 A | 3/2010 |
| WO | WO0173466 A1 | 10/2001 |
| WO | WO-2006122041 A2 | 11/2006 |
| WO | WO-2008041143 A1 | 4/2008 |
| WO | WO-2008143379 A1 | 11/2008 |

OTHER PUBLICATIONS

European Search Report—EP13020070—Search Authority—Munich—Oct. 9, 2012.

\* cited by examiner

WIRELESS TRACKING DEVICE

CROSS-REFERENCE TO RELATED APPLICATIONS

This application claims the benefit of and priority to U.S. Provisional Application No. 61/318,722 filed Mar. 29, 2010, titled "Method for attaching wireless tracking device" and which is expressly incorporated herein by reference.

BACKGROUND

I. Field of the Invention

This disclosure relates generally to apparatus and methods for wireless tracking. More particularly, the disclosure relates to wirelessly tracking a person who is to be monitored using an attached-wearable article.

II. Background

Global Positioning System (GPS) wireless tracking devices used by caregivers for children five (5) years and older and are designed to either be worn as apparel (like a wristwatch) or inserted into a backpack. For example, nu. m8 from Lok8u LLC of New Jersey (www.lok8u.com) manufactures a wristwatch-type GPS device for locating children wearing the device. A wristband device may be readily removed by the child or someone with the child and therefore no longer able to accurately track the child. Similarly, a backpack-type device may become separated from the child if the device is removed from the backpack or the backpack is left behind. Similar devices may be used for tracking special needs individuals, for example, someone with Alzheimer's, or an athlete wanting to track training progress. For comfort of the person wearing the device, the device is designed to be easily removed.

Other tracking devices place an emphasis on monitoring and less on comfort. Such devices are primarily used for judicial compliance of an individual, for example, someone under house arrest or having other time and place restrictions. Typically, the GPS monitoring devices are worn around the ankle. These ankle bracelets are keyed such that the monitored person may not remove the device.

In general, these devices suffer several drawbacks. The devices tailored to children are easily removable. The devices tailored to monitoring judicial compliance are permanently fixed to the body and uncomfortable to the wearer. The wearable devices are conspicuous, and therefore, wearers may have size and fashion concerns. A backpack device can easily be misplaced or discarded.

Therefore, it is desired to have a device a trusted caregiver may easily attach and detach from clothing of a person needing care or monitoring (e.g., a child, at-risk adult, a senior citizen, sportsperson, late-night jogger, etc.), yet allow the device to be inconspicuous, secure and difficult to remove by an unauthorized person. A new device is needed that has both the qualities of being more permanently attached and more comfortable. Thus, a tracking device that is comfortable, inconspicuous and not easily removable is desired.

BRIEF SUMMARY

Disclosed is an apparatus and method for a tracking device to inconspicuously track a person to be monitored (e.g., child or adult). According to some aspects, disclosed is a tracking device for wirelessly tracking an attached-to wearable article, the device comprising: housing comprising a locking mechanism attachable to the wearable article; and electronic circuitry within the housing comprising a positioning receiver; a wireless transmitter; and a processor coupled with memory, coupled to the positioning receiver and wireless transmitter in order to report a determined position.

According to some aspects, disclosed is a tracking system for wirelessly tracking a person, the tracking system comprising: a radio frequency tag (RF tag) fixable to the person; and electronic circuitry physically unattached to the RF tag, the electronic circuitry comprising a positioning receiver; a wireless transmitter to report; a personal area network receiver (PAN receiver) coupled to the RF tag with PAN communication; and a processor with memory, coupled to the positioning receiver, WAN transmitter and the PAN receiver to report a determined position.

According to some aspects, disclosed is a method for wirelessly tracking, the method comprising: attaching a tracking device to a wearable article of clothing, wherein the tracking device including electronic circuitry; locking the tracking device to the wearable article of clothing; receiving positioning signals at the electronic circuitry; estimating a position estimate from the positioning signals; and reporting the position estimate over a wireless network.

According to some aspects, disclosed is a method for wirelessly tracking, the method comprising: attaching a radio frequency tag (RF tag) to a person to be monitored; placing a tracking device into a pocket in proximity to the RF tag, wherein the tracking device including electronic circuitry, and wherein the tracking device and RF tag form a personal area network (PAN); receiving positioning signals at the electronic circuitry; estimating a position estimate from the positioning signals; and reporting the position estimate over a wireless network.

According to some aspects, disclosed is a method for wirelessly tracking, the method comprising: attaching a radio frequency tag (RF tag) to one of a wrist, angle or shoe; placing a tracking device into a pocket in proximity to the RF tag, wherein the tracking device includes electronic circuitry; communicating between the RF tag and the electronic circuitry over a personal area network (PAN); receiving positioning signals at the electronic circuitry; estimating a position estimate from the positioning signals; determining the RF tag is not within the PAN; and reporting the position estimate over a wireless network in response to determining the RF tag is not within the PAN.

According to some aspects, disclosed is a tracking device for wirelessly tracking, the tracking device comprising: means for attaching a tracking device to a wearable article of clothing, wherein the tracking device including electronic circuitry; means for locking the tracking device to the wearable article of clothing; means for receiving positioning signals at the electronic circuitry; means for estimating a position estimate from the positioning signals; and means for reporting the position estimate over a wireless network.

According to some aspects, disclosed is a tracking system for wirelessly tracking a person, the tracking system comprising: means for attaching a radio frequency tag (RF tag) to one of a wrist, angle or shoe of the person; means for placing a tracking device into a pocket in proximity to the RF tag, wherein the tracking device includes electronic circuitry; means for communicating between the RF tag and the electronic circuitry over a personal area network (PAN); means for receiving positioning signals at the electronic circuitry; means for estimating a position estimate from the positioning signals; and means for determining the RF tag is not within the PAN; and means for reporting the position estimate over a wireless network in response to determining the RF tag is not within the PAN.

According to some aspects, disclosed is a computer-readable medium tangibly embodying a program of machine-readable instructions executable by a digital processing apparatus to perform a method for wirelessly tracking, said method comprising operations of: controlling electronic circuitry; and detecting a cause and in response to the cause: receiving positioning signals at the electronic circuitry; estimating a position estimate from the positioning signals; and reporting the position estimate and the cause over a wireless network.

According to some aspects, disclosed is a computer-readable medium tangibly embodying a program of machine-readable instructions executable by a digital processing apparatus to perform a method for wirelessly tracking, said method comprising operations of: communicating between a radio frequency tag (RF tag) and an electronic circuitry over a personal area network (PAN); and detecting a cause and in response to the cause: receiving positioning signals at the electronic circuitry; estimating a position estimate from the positioning signals; determining the RF tag is not within the PAN; and reporting the position estimate and the cause over a wireless network in response to determining the RF tag is not within the PAN.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN or WAN), a wireless local area network (WLAN), a wireless personal area network (WPAN or PAN), a wireless network, and so on. The term "network" and "system" are often used interchangeably. A wireless network or WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. A Bluetooth® network operates with Bluetooth® products. Bluetooth products or Bluetooth-type devices and Bluetooth-type transceivers include products that comply with the Bluetooth Specification(s) and/or Foundation Specification and have passed the Bluetooth qualification process, as specified by Bluetooth SIG. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a tracking device 10, may include circuitry of devices referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term mobile station is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, mobile station is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a mobile station.

The background section describes known GPS tracking devices. In an unrelated technology, inventory control systems are used to detect unauthorized merchandize removal from a retailer. These systems use radio frequency (RF) tags, which are semi-permanently attached to the merchandise, such as an article of clothing. The RF tags are also known as anti-pilferage tags and security tags. These RF tags have a locking mechanism, which includes a pin and two separable sections. The locking mechanism uses the pin to hold the two sections together. When locked in place, the pin pierces fabric of the merchandize and sandwiches the fabric between the two sections. The RF tags also have passive radio frequency characteristics, which allow them to be detected when passed within a few feet of a transmitter/receiver assembly. For example, see U.S. Pat. Nos. 4,321,586, 4,751,500, 4,999,609 and 5,990,791. These anti-pilferage tags are available in large volume from a variety of sources. They are designed to be difficult to remove without a special tool, and not to damage the clothes to which they are attached unless tampered with. If these pilferage tags are removed from a store without first removing the anti-pilferage tag, an alarm in a doorway may trigger. If these anti-pilferage tags are tampered with or forcibly removed from the clothing, the anti-pilferage tag may leak ink onto the clothing.

Conceptually, a type of anti-pilferage tag may be modified to house a tracking or positioning receiver (e.g., a GNSS or SPS receiver such as a GPS receiver) and a wireless communication device or WAN transmitter (e.g., a WAN transceiver such as a cellular transceivers, Wi-Fi transceivers, etc.) giving a device the ability to track and report a current location. A parent or trusted caregiver, for example, may use a tool to remove and/or apply the tracking device. Embodiments may also include an alert mechanism to trigger if the tracking device is removed by an unauthorized person, without a proper code, without a proper tool, or forcibly removed. An alert mechanism may include an audible alert from a speaker or siren attached to the electronic circuitry 100 and/or sending of an alert message, such as an SMS message or an email, sent to one or more recipients (e.g., parent(s), caregiver, and/or police or other authorities) sent via the WAN transmitter 130.

Some embodiments of the present invention combine a positioning receiver 110 (e.g., a GPS receiver) and a locking mechanism 210 to act as a tracking device 10, which attaches to an article of clothing or fabric wearable by the person to be tracked and monitored. In a first set of embodiments, shown in FIGS. 1-6, a tracking device 10 includes electronic circuitry 100 within a housing (e.g., a first section 220 and a second section 230 similar to an anti-pilferage tag used in merchandise inventory control). The electronic circuitry 100 includes a positioning receiver 110 to receive positioning signals (e.g., GPS signals), a WAN transmitter 130 to transmit and report a determined position, and a processor 120 with memory 122 coupled in order to control the positioning receiver 110 and the WAN transmitter 130. In some of these embodiments, the WAN transmitter 130 is a mobile radio transceiver. Often the WAN transmitter 130 is part of a WAN transceiver.

Some embodiments of the present invention keep a positioning receiver 110 and a radio frequency identification tag (RFID tag) or other RF tag 310 physically separate but in RF proximity of each other. The positioning receiver 110 and the RF tag 310 communicate over a personal area network (PAN). The RF tag 310 is attached to an article of clothing worn by to the person to be monitored. Alternatively, the RF tag 310 (such as a bracelet or anklet) is worn directly by to the person to be monitored. In a second set of embodiments, shown in FIGS. 7-12, a system includes an RF tag 310 (e.g., a passive tag or Bluetooth® device) fixable around an ankle or wrist or incorporated with a shoe or attached to some article of clothing. The system also includes electronic circuitry 100 physically unattached to and remote from the RF tag 310. The electronic circuitry 100 may be sized for placing into a pocket or backpack of the person to be monitored. The electronic circuitry 100 includes a positioning receiver 110 (e.g., a GPS-type device) to receive positioning signals, a WAN transmitter 130 to transmit a determined position, a PAN receiver 320 to communicate with the RF tag 310, and a processor 120 with memory 122 coupled in order to control the positioning receiver, the WAN transmitter 130 and the PAN receiver 320. In some of these embodiments, the WAN transmitter 130 is a mobile radio transceiver. In some of these embodiments, the PAN receiver 320 is includes an RFID transceiver and/or a Bluetooth® transceiver. The PAN receiver 320 may be passive or active.

Figure 1:
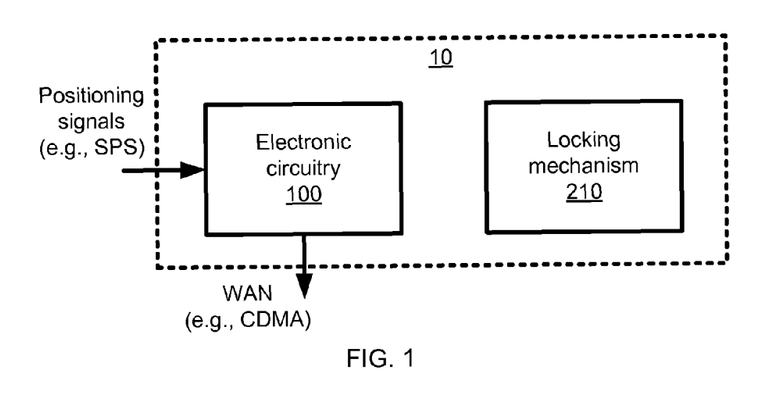
FIGS. 1, 2 and 3 show block diagrams for a tracking device, in accordance with some embodiments of the present invention.
Figure 2:
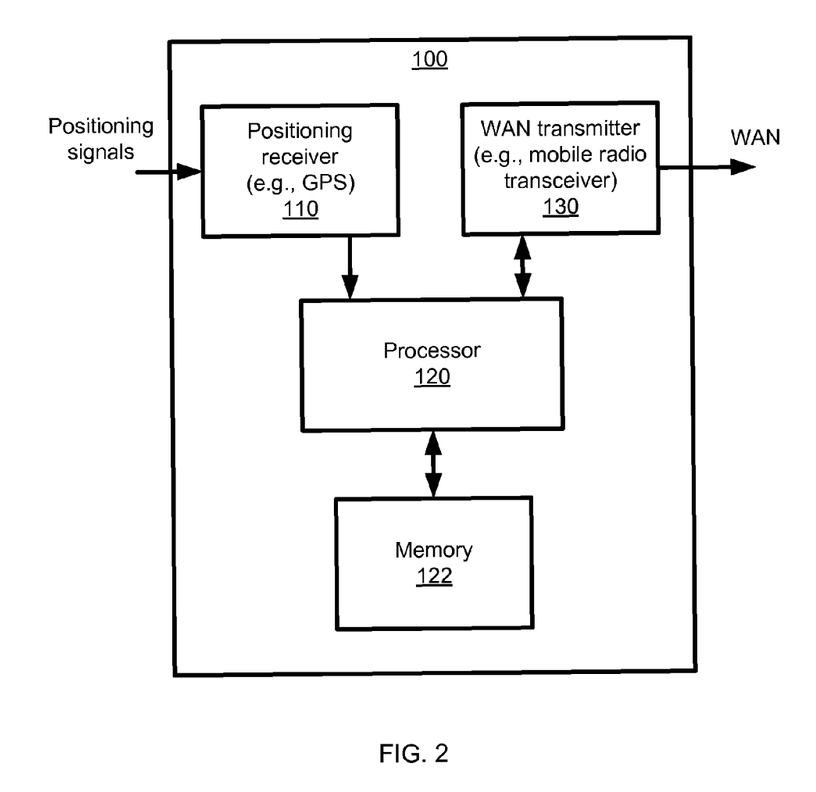
Figure 3:
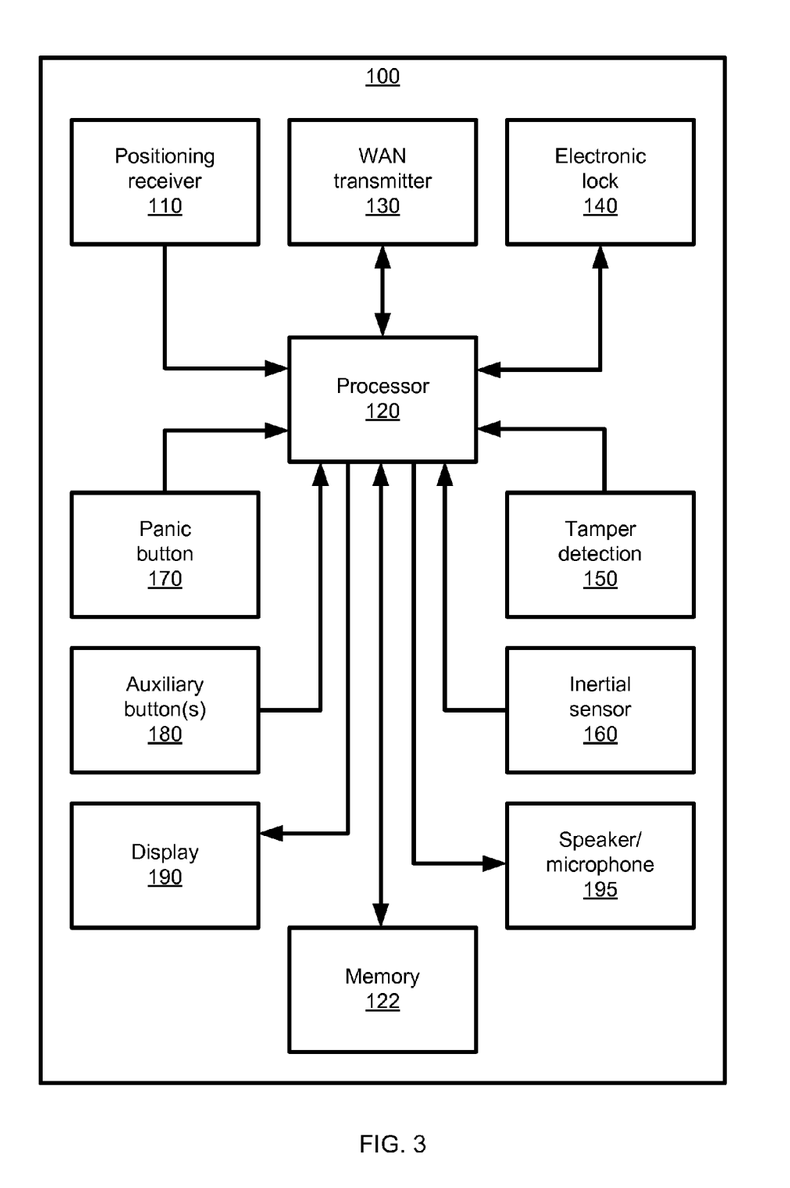

FIGS. 1, 2 and 3 show block diagrams for a tracking device 10, in accordance with some embodiments of the present invention. FIG. 1 conceptually shows a tracking device 10, which includes electronic circuitry 100 and a locking mechanism 210. The electronic circuitry 100 and a locking mechanism 210 may be co-housed or split within two or more separable housings.

FIG. 2 shows a block diagram of the electronic circuitry 100. The electronic circuitry 100 includes a positioning receiver 110, a processor 120 with memory 122, and a WAN transmitter 130. The positioning receiver 110 receives wireless signals from one or more wireless systems such from a GPS system (or other SPS or GNSS system) and/or a cellular network and/or Wi-Fi access points. The positioning receiver 110 provides positioning information to the processor 120. The positioning information may include a position indication such as a longitude and latitude (LL) or a longitude, latitude and an altitude (LLA) and/or may include a displacement indication such as a Cardinal displacement or a Cardinal displacement with an elevation change. Each indication may be provided with or without an associated uncertainty value.

The processor 120 is coupled to communicate with and control the positioning receiver 110 and the wireless transmitter 130. The wireless transmitter 130 may be a WAN transmitter. The processor 120 or processing unit(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, or other electronic units designed to perform the functions described herein, or a combination thereof. The memory 122 may be external to the processor 120 and/or may be an internal to the processor 120.

The processor 120 coupled to memory 122 holds software or program code to execute methods described herein. For example, the memory 122 contains code for: receiving positioning signals from a positioning receiver 110 in the electronic circuitry 100, wherein the processor 120 controls the positioning receiver 110; estimating a position estimate from the positioning signals using either the positioning receiver 110 or the processor 120; and reporting the position estimate over a wireless network using a wireless transmitter 130, wherein the processor 120 controls both the positioning receiver 110 and the wireless transmitter 130.

The wireless transmitter 130 provides access to a wireless network and typically includes a mobile radio transceiver such as found in a cellular device. The wireless transmitter 130 may include a separate processor from processor 120 or the processor 120 may perform signal processing typically found in a mobile radio transceiver. The positioning receiver 110 and wireless transmitter 130 may be independent, have overlapping circuitry, share circuitry or be provided in an integrated module.

In FIG. 3, a block diagram of a more elaborate tracking device 10 is shown. The electronic circuitry 100 includes a positioning receiver 110, a processor 120 with memory 122, and a wireless transmitter 130, as described above. The electronic circuitry 100 also includes one or more of an electronic lock 140, a tamper detection module 150, an inertial sensor 160, a panic button 170, additional auxiliary buttons 180, a display 190 and a speaker/microphone 195, each coupled to communicate with the processor 120. The electronic lock 140 may include be unlocked with a pin pad, hard buttons, soft buttons on a touchscreen, voice command module, or an electronic message such as an SMS message, email or internet protocol (IP) message.

The tamper detection module 150 detects when the locking mechanism 210 of the tracking device 10 is forcibly unlocked or unlocked without authorization. When the tamper detection module 150 detects the locking mechanism 210 has been tampered with or broken, the tamper detection module 150 may trigger an alarm in the processor 120 with an alert mechanism. In turn, the alarm may initiate an audible alarm or siren at the tracking device 10 and/or may initiate alert messages being transmitted over the wireless transmitter 130.

The inertial sensor 160 such as a one, two or three-dimensional accelerometer and/or a one, two or three-dimensional gyrometer may augment the positioning receiver 110 when positioning signals are inadequate or unavailable. The inertial sensor 160 may also be used for shock detection and triggering a resultant alarm.

The panic button 170 is a physical button on the tracking device 10 that the user can send an immediate alarm or SOS signal. The panic button 170 may be associated with a microphone to record or transmit sound heard by the tracking device 10. The panic button 170 may initiate a call to a preprogrammed phone number (e.g., a parent's cell phone number, 911, etc.). The panic button 170 may activate an audio alarm so others passing nearby may lend assistance. The panic button 170 may include one or more such panic buttons readably accessible, each with a unique or preprogrammed function such as those listed above (e.g., "Call Mom" and "Call Dad"). The additional auxiliary buttons 180 include other programmable buttons and/or pre-assigned functional buttons. These auxiliary buttons 180 may be provided by physical buttons and/or by software via a touch screen.

The display 190 may include a single-line or multi-line text display. The display 190 may be an LED or LCD-type screen. The display 190 may incorporate touch-screen technology to act as an input/output device. The tracking device 10 may also include other input/output devices, such as a USB port (not shown) or other external port coupled to the processor 120. The speaker/microphone 195 may include a speaker and a microphone to allow a person being monitored to have a conversion (such as allowing a child to have a conversation, with a parent, caregiver, 911 operator, etc., over a cellular telephone call). The speaker/microphone 195 may include a microphone to allow a parent to listen into activity near the tracking device 10. The speaker/microphone 195 may include a speaker to allow the tracking device 10 with an alert mechanism to sound an alarm, siren, warning or alert message.

Figure 4:
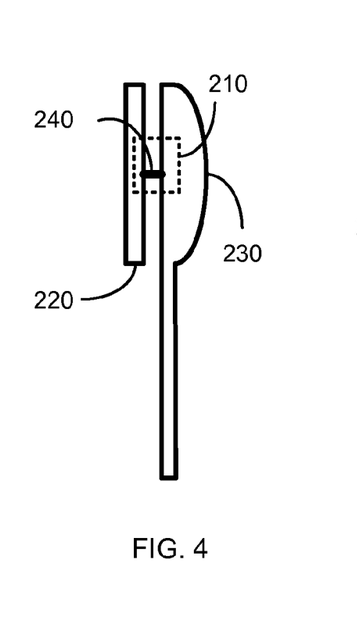
FIGS. 4, 5 and 6 show a housing of a tracking device, in accordance with some embodiments of the present invention.
Figure 5:
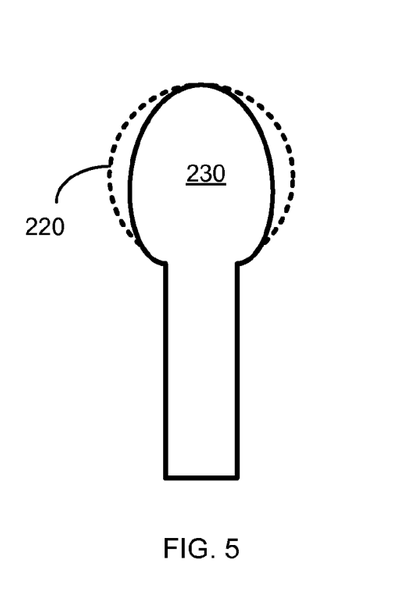
Figure 6:
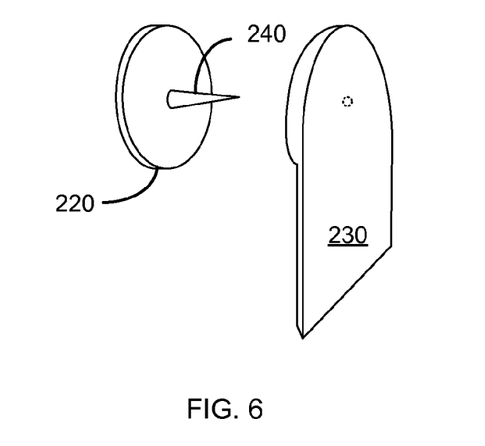

FIGS. 4, 5 and 6 show a housing of a tracking device, in accordance with some embodiments of the present invention. The figures show a housing similar to a housing of an anti-pilferage tag. The housing includes a first section 220 and a second section 230. The housing includes a locking mechanism 210 integrated into the first section 220 and the second section 230. The locking mechanism 210 may be a pin and receptacle similar as in the anti-pilferage tag. Alternatively, the locking mechanism 210 may include an electronic lock that requires a pin code to unlock or may include a mechanical combination or key lock.

As shown in FIGS. 4 and 5, the first section 220 and the second section 230 may be locked together with a locking mechanism 210. The locking mechanism 210 is used to attach the tracking device 10 to some wearable article of clothing or other apparel such as a shirt, jacket or even a shoe. As shown in FIG. 6, the first section 220 and the second section 230 are detachable from each other by disengaging a locking mechanism 210. In this case, the locking mechanism 210 includes a pin 240 as part of the first section 220, which is positioned to pierce the wearable article of clothing. The locking mechanism 210 also includes a latch or other receptacle in the second section 230, which is positioned to detachably lock to the pin 240 in the first section 220. The electronic circuitry 100 may reside within the housing (for example, within the second section 230) and may include the positioning receiver 110, the processor 120 with memory 122, and the wireless transmitter 130 confined to a limited space provided by the housing.

The embodiments described above are inconspicuous because the tracking device 10 is generally hidden from view and semi-permanently attached to an article of clothing worn by the person to be monitored. That is, the locking mechanism 210 allows for the tracking device 10 to be placed in a location not seen by to an assailant and not conspicuous to others. The embodiments described below are inconspicuous because a section attached to, for example, the child to be monitored does not appear to an assailant to be part of a tracking device.

Figure 7:
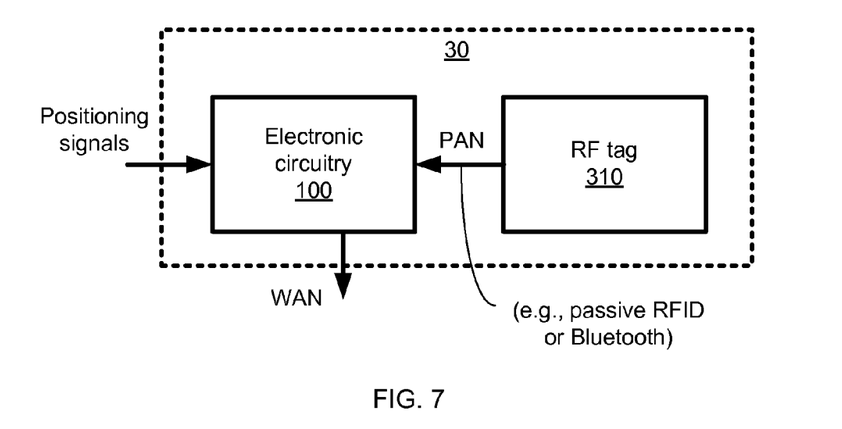
FIGS. 7, 8, 9 and 10 show an RFID tag that operates remotely with electronic circuitry, in accordance with some embodiments of the present invention.
Figure 8:
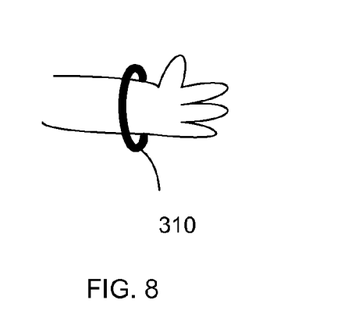
Figure 9:
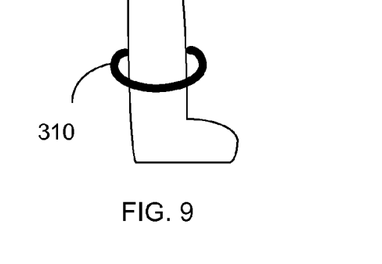
Figure 10:
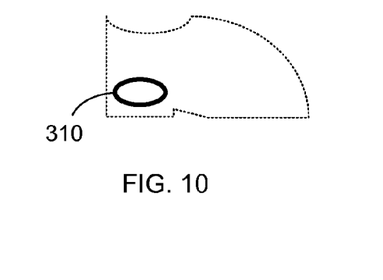

FIGS. 7, 8, 9 and 10 show an RF tag 310 that operates remotely with electronic circuitry 100, in accordance with some embodiments of the present invention. In FIG. 7, a tracking system 30 consists of a RF tag 310 and an electronic circuitry 100. A tracking system 30 may sometimes be referred to as a tracking device 10. The RF tag 310 may be a passive RF tag (similar to an anti-pilferage tag) or may be a passive RFID device (other RFID used in asset management and tracking) or may be a long-battery live device (such as a Bluetooth device). The RF tag 310 may also be waterproof or water resistant. The electronic circuitry 100 of tracking system 30 contains functionality equivalent or similar to the electronic circuitry 100 of tracking device 10. The electronic circuitry 100 receives positioning signals (e.g., GPS or other SPS signals) and communicates and reports over WAN (e.g. CDMA) network. The electronic circuitry 100 communicates over a PAN (e.g., via passive RFID or Bluetooth® signals) with the RF tag 310. The electronic circuitry 100 acts as a proximity sensor communicating with the RF tag 310. The RF tag 310 may be worn as an armband or bracelet (as shown in FIG. 8), as an anklet (as shown in FIG. 9) or as an inserted underneath an insole, shoe insert or arch support of a shoe (as shown in FIG. 10). The RF tag 310 may include an active or passive RFID tag that reacts when stimulated with an RF signal from the PAN receiver 320.

Figure 11:
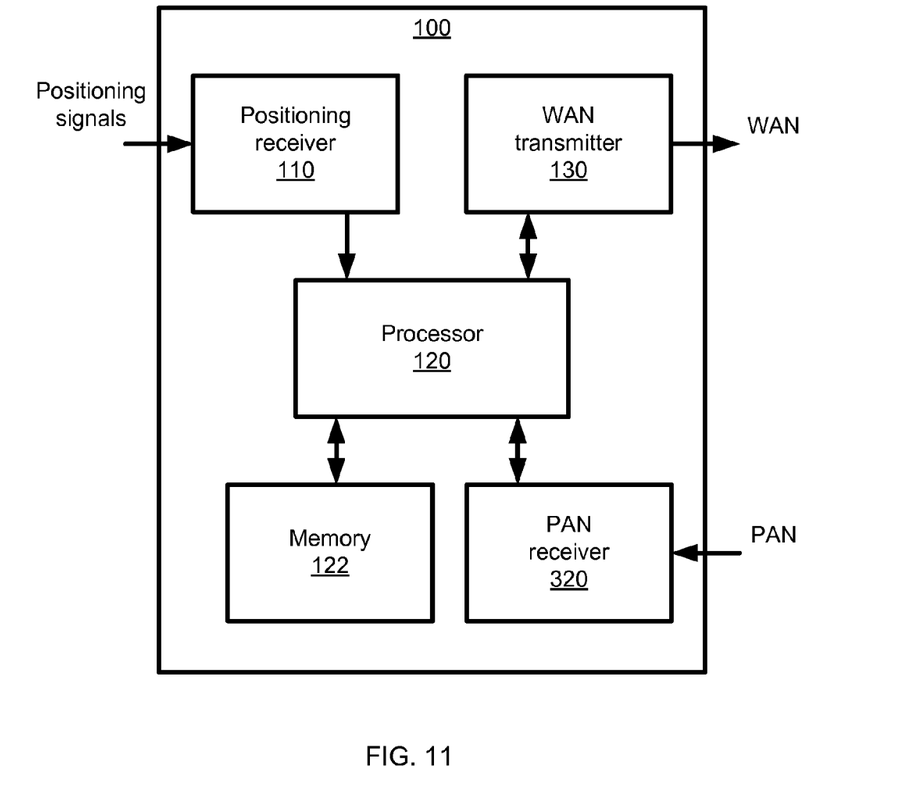
FIGS. 11 and 12 show block diagrams for a tracking device, in accordance with some embodiments of the present invention.
Figure 12:
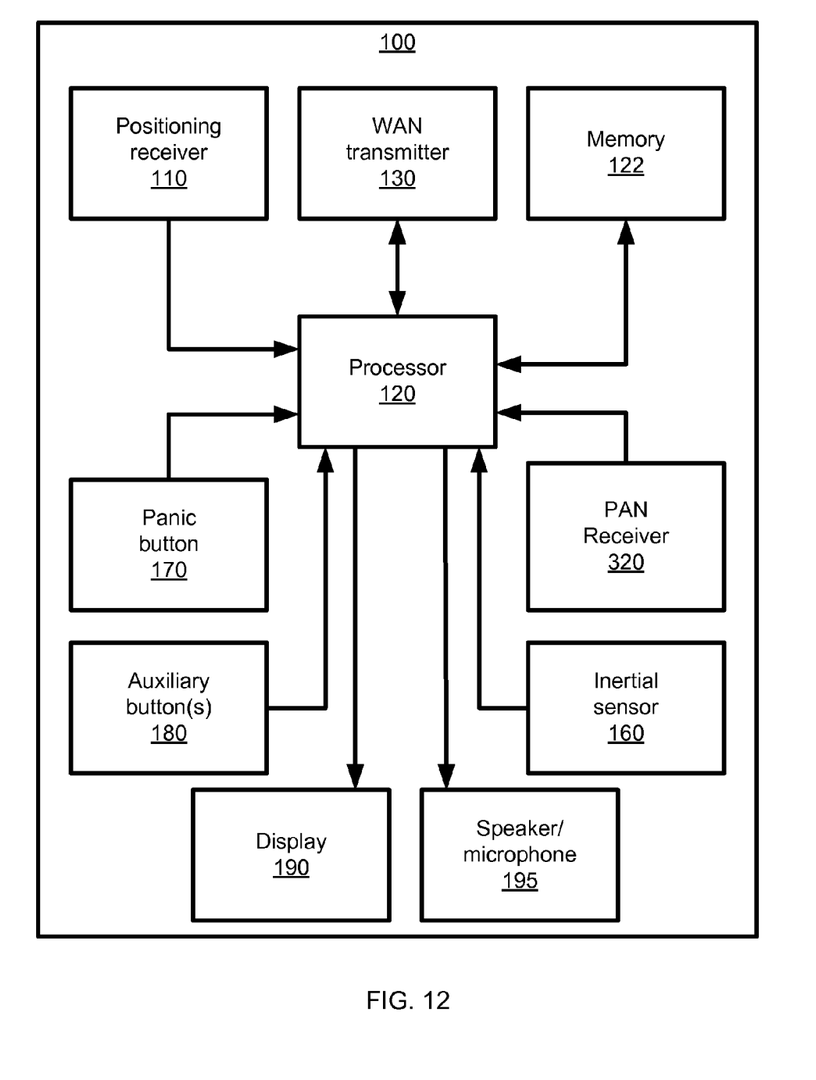

FIGS. 11 and 12 show block diagrams for a tracking device, in accordance with some embodiments of the present invention.

In FIG. 11, a block diagram shows functional detail of the electronic circuitry 100 of a tracking system 30. The electronic circuitry 100 includes a positioning receiver 110, a processor 120 with memory 122, and a wireless transmitter 130, as described above with reference to FIG. 3. In these embodiments, the electronic circuitry 100 is not as restricted in size as compared to the electronic circuitry 100 of the tracking device 10 but further includes a PAN receiver 320.

As described above, the processor 120 coupled to memory 122 holds software or program code to execute methods described herein. For example, the memory 122 contains code for: communicating between and RF tag 310 and a PAN receiver 320 in the electronic circuitry 100 over a personal area network (PAN); receiving positioning signals at a positioning receiver 110 in the electronic circuitry 100; estimating, with either the positioning receiver 110 or the processor 120, a position estimate from the positioning signals; and determining at the processor 120 that the RF tag 310 is not within the PAN; and reporting the position estimate over a wireless network with a wireless transmitter 130 in response to determining the RF tag 310 is not within the PAN.

The PAN receiver 320 controls a PAN network and communicates with a proximately positioned RF tag 310. In some embodiments, the PAN receiver 320 includes a transmitter to activate the RF tag 310 (e.g., a passive RFID tag) and a receiver to receive a reflection of its signal from the RF tag 310. Alternatively, the PAN receiver 320 includes a low-power proximity transceiver (e.g., a Bluetooth® transceiver) to communicate with a RF tag 310 (e.g., a low-power Bluetooth® device) via a low-powered communication link. A passive tag or a low-powered tag allows the RF tag 310 to be disposed of and easily replaced when lost or misplaced or a battery discharges.

In FIG. 12, the electronic circuitry 100 includes a positioning receiver 110, a processor 120 with memory 122, a wireless transmitter 130 and a PAN receiver 320, as described above. The electronic circuitry 100 may also include one or more of an inertial sensor 160, a panic button 170, additional auxiliary buttons 180, a display 190 and a speaker/microphone 195, each coupled to communicate with the processor 120, as described above with reference to FIG. 3. The electronic lock 140 and tamper detection 150 may no longer be relevant if the electronic circuitry 100 is located in a remote housing separate from the RF tag 310.

The electronic circuitry 100 of the tracking device 10 and electronic circuitry 100 of the tracking system 30 may also include a microphone for voice recording or audio monitoring and/or a keypad for texting information and/or buttons to send predefined indications or messages, for example, to a parent's cell phone and/or computer email.

Also, the electronic circuitry 100 may be programmed with an alert mechanism to send an alert when the tracking device 10 or tracking system 30 breaks a geo-fencing rule. For example, this geo-fence trigger would alert if the tracking device 10 or tracking system 30 crosses a boundary or is no longer within a boundary, such as a home boundary, school boundary, care taker's facility or a computing corridor between these places. The geo-fence trigger could alarm if the tracking device 10 or tracking system 30 was not within one of these areas or was not within a certain area within a predefined window of time. The geo-fence trigger could use the processor 120 and the wireless transmitter 130 to send an SMS message or email to a list of recipients. The tracking device 10 or tracking system 30 may periodically send non-urgent messages to a logging file accessible to a parent online, for example, via a map on a website.

FIGS. 13, 14, 15 and 16 show methods of operating a tracking device, in accordance with some embodiments of the present invention.

Figure 13:
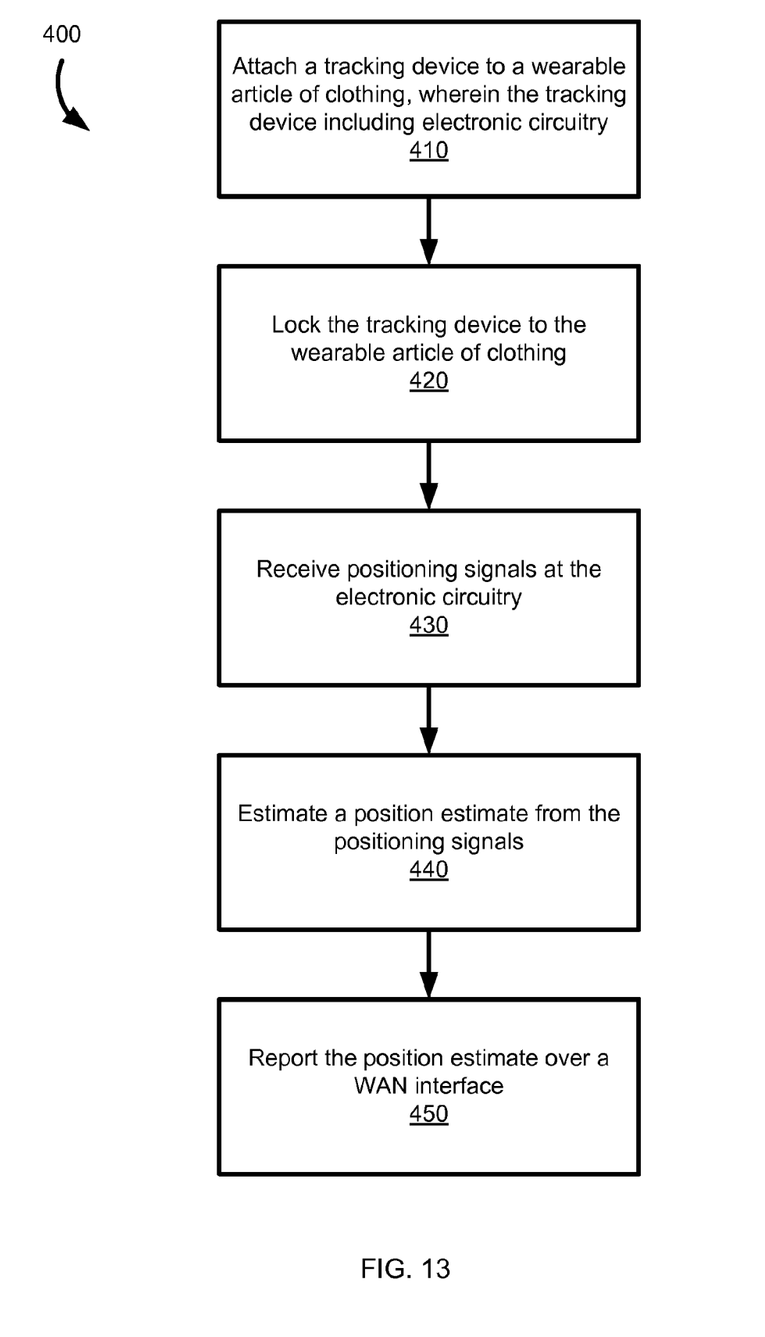
FIGS. 13, 14, 15 and 16 show methods of operating a tracking device, in accordance with some embodiments of the present invention.

FIG. 13 shows a method 400 for wirelessly tracking. At 410, a person attaches a tracking device 10 to a wearable article of clothing, such as a shirt, jacket, pant or a shoe, in an inconspicuous location, for example, on the inside of the article of clothing. The tracking device includes electronic circuitry 100. At 420, the person locks the tracking device 10 to the wearable article of clothing using a locking tool such that removal without the tool is detectable. At 430, a positioning receiver 110 in the electronic circuitry 100 receives positioning signals. At 440, the positioning receiver 110 or the processor 120 estimates a position estimate from the positioning signals. Finally, at 450, the processor 120 reports the position estimate over a wireless network using a wireless transmitter 130.

Figure 14:
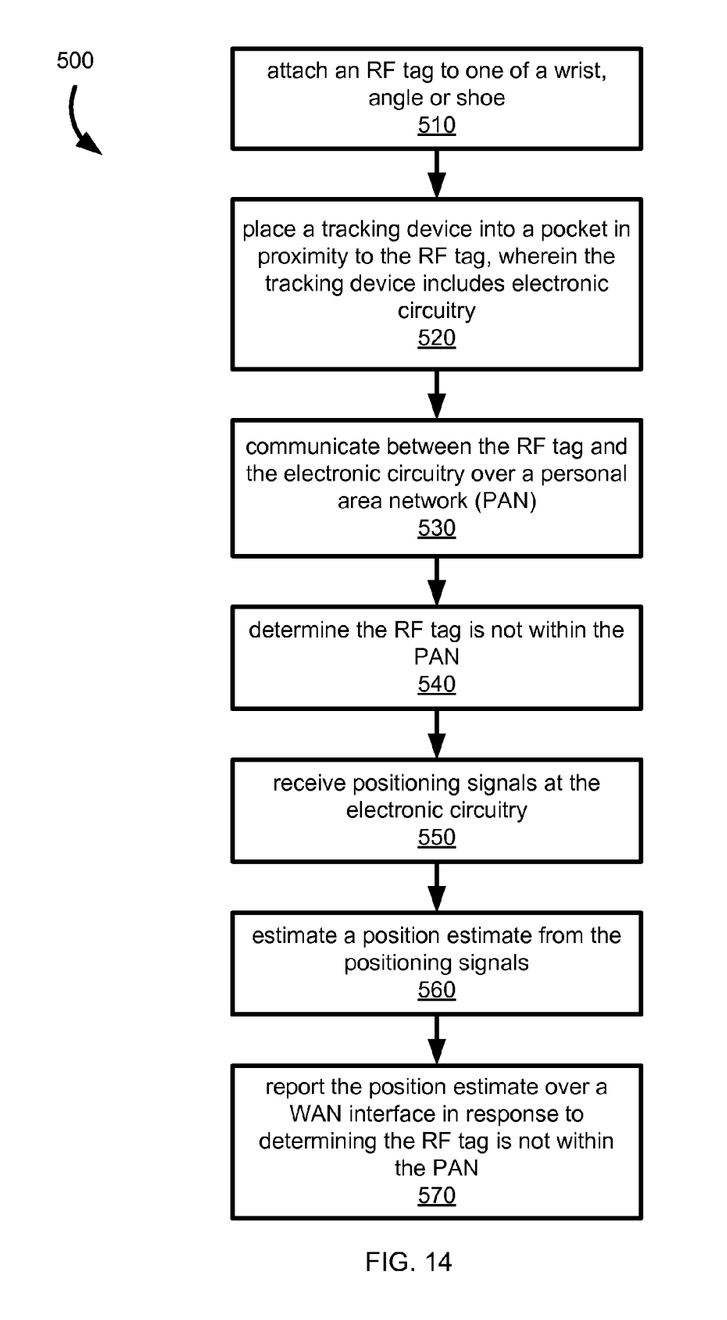

FIG. 14 shows a method 500 for wirelessly tracking. At 510, a person attaches an RF tag 310 to a wrist, angle or shoe of the person to be tracked. At 520, the person places a tracking device 30 into a pocket in proximity to the RF tag 310, wherein the tracking device 30 includes electronic circuitry 100. At 530, a PAN receiver 320 communicates from the RF tag 310 and the electronic circuitry 100 over a personal area network (PAN).

At 540, the processor 120 determines the RF tag 310 is not within the PAN. The PAN is defined by a physical area where communication may occur between the PAN receiver 320 and the RF tag 310. When the PAN receiver 320 can receive an understandable signal from the RF tag 310, the RF tag 310 is within the PAN. When the PAN receiver 320 is unable to receive an understandable signal from the RF tag 310, the RF tag 310 is not within the PAN (e.g., the RF tag 310 is out of range).

At 550, a positioning receiver 110 in the electronic circuitry 100 receives positioning signals. At 560, the positioning receiver 110 or a processor 120 estimates a position estimate from the positioning signals.

At 570, the processor 120 reports the position estimate using a wireless transmitter 130 over a wireless network in response to determining the RF tag 310 is not within the PAN.

Figure 15:
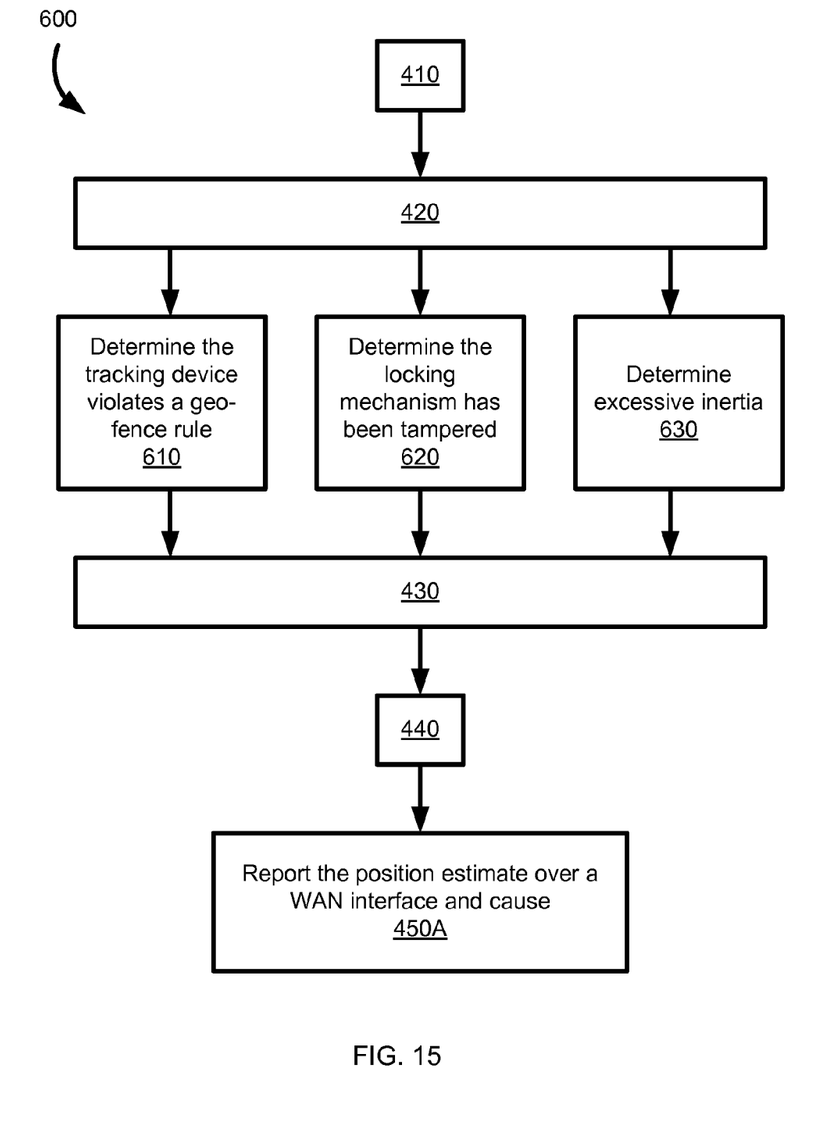

FIG. 15 shows a method 600 for wirelessly tracking. Steps 410, 420, 430 and 440 operate as described above. At 610, an alert mechanism (e.g., in the electronic circuitry 100) determines the tracking device 10 is violating a geo-fence rule. At 620, the alert mechanism determines the locking mechanism 210 has been tampered with. At 630, the processor 120 receives signals from an inertia sensor 160 and determines the signals represent an inappropriate level or dangerous amount of angular or linear acceleration. As a result, of step 610, 620 or 630, steps 430 and 440 are executed as described above to determine a position estimate. At 450A, the processor 120 reports the position estimate over a wireless network using a wireless transmitter 130. In this case, the report may also include a cause such as a violation of a geo-fence rule, or a tamper detection, or an excessive acceleration that may indicate an injury to the person being monitored.

Figure 16:
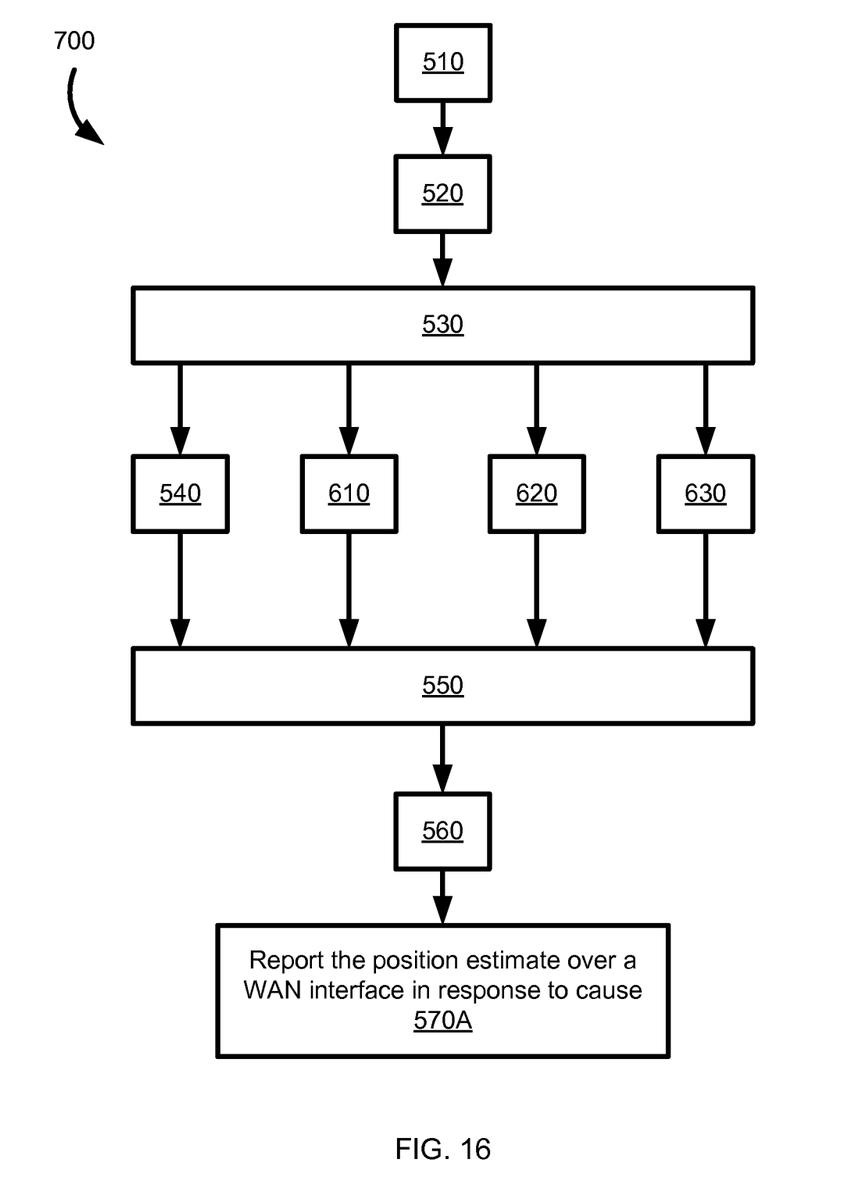

FIG. 15 shows a method 700 for wirelessly tracking. Steps 510, 520, 530, 540, 550, 560, 610, 620 and 630 are as described above. As a result of 540, 610, 620 or 630, steps 550 and 560 determine an estimated position. At 570A, the processor 120 reports the position estimate using a wireless transmitter 130 over a wireless network in response to the cause determined at 540, 610, 620 or 630 (i.e., RF tag 310 out of range, a geo-fence violation, tampering detection, or excessive inertia detection).

Reporting at steps 450, 450A, 570 and 570A may include sending a message (e.g., including one or more of sending SMS message(s), sending verbal message(s), sending email message(s) and/or sending log file entry(ies), etc.) to one or more predefined recipients (e.g., parent(s), caregiver, and/or police or other authorities).

The methodologies described herein may be implemented by various means depending upon the application. For example, these methodologies may be implemented in hardware, firmware, software, or any combination thereof. For a hardware implementation, a processor 120 (including one or more processing units) with or without memory 122 may be used.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 122 and executed by a processor 120. Memory 122 may be implemented within the processor 120 or external to the processor 120. As used herein the term memory 122 refers to any type of long term, short term, volatile, nonvolatile, or other memory and is not to be limited to any particular type of memory or number of memories, or type of media upon which is stored to memory 122.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray Disc® where disks usually reproduce data magnetically, while disks reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors 120 to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A tracking device comprising:
a housing comprising;
a locking mechanism attachable to a wearable article; and
electronic circuitry within the housing comprising;
a positioning receiver;
a wireless transmitter;
a processor coupled to memory, the positioning receiver, and the wireless transmitter; and
an inertial sensor configured to sense acceleration, wherein in response to the sensed acceleration, the inertial sensor instructs the positioning receiver to generate a position estimate, and wherein the inertial sensor is further configured to perform a position determination when positioning signals are unavailable to the positioning receiver.

2. The tracking device of claim 1, wherein the housing further comprises:
a first section and a second section, wherein the first and second sections are detachable from each other, and wherein the locking mechanism comprises:
a pin in the first section and positioned to pierce the wearable article; and
a latch in the second section and positioned to detachably lock the pin in the first section.

3. The tracking device of claim 1, wherein the positioning receiver comprises a Global Positioning System receiver (GPS receiver).

4. The tracking device of claim 1, wherein the wireless transmitter comprises a mobile radio transceiver.

5. The tracking device of claim 1, wherein the locking mechanism comprises an electronic lock configured to be unlocked electronically via a personal identification number (PIN) code or a received message.

6. The tracking device of claim 1, wherein the electronic circuitry further comprises at least one of:

an alert mechanism;
a panic button;
at least one auxiliary button; or
a display.

7. The tracking device of claim 1, wherein the electronic circuitry further comprises a geo-fence trigger.

8. The tracking device of claim 1, wherein the wireless transmitter is a wide area network (WAN) transmitter.

9. A method comprising:
sensing acceleration by an inertial sensor of a tracking device attached to a wearable article of clothing, wherein in response to the sensed acceleration, the inertial sensor instructs a positioning receiver of the tracking device to generate a position estimate;
when positioning signals are available to the positioning receiver:
receiving the positioning signals at the positioning receiver;
estimating the position estimate from the positioning signals; and
when positioning signals are unavailable to the positioning receiver:
determining the position estimate by the inertial sensor; and
reporting the position estimate over a wireless network.

10. The method of claim 9, wherein the article of clothing is one of a shirt, jacket, or pants.

11. The method of claim 9, wherein the wireless network is a wide area network (WAN).

12. An apparatus comprising:
means for sensing acceleration of a tracking device attached to a wearable article of clothing;
means for receiving positioning signals;
means for estimating a position estimate from the positioning signals; and
means for reporting the position estimate over a wireless network,
wherein in response to the sensed acceleration, the means for sensing instructs the means for estimating to generate the position estimate, and wherein the means for sensing is configured to perform a position determination when the positioning signals are unavailable to the means for receiving.

13. The apparatus of claim 12, wherein the means for reporting the position estimate reports via a wide area network (WAN).

14. A computer-readable medium tangibly embodying a program of machine-readable instructions executable by a digital processing apparatus to perform a method, said method comprising operations of:
sensing acceleration by an inertial sensor of a tracking device attached to a wearable article of clothing, wherein in response to the sensed acceleration, the inertial sensor instructs a positioning receiver of the tracking device to generate a position estimate;
when positioning signals are available to the positioning receiver:
receiving the positioning signals at the positioning receiver;
estimating the position estimate from the positioning signals; and
when positioning signals are unavailable to the positioning receiver:
determining the position estimate by the inertial sensor; and
reporting the position estimate over a wireless network.

15. The computer-readable medium of claim 14, wherein the reporting of the position estimate occurs via a wide area network (WAN).

* * * * *